United States Patent [19]

Redi

[11] Patent Number: 4,484,380
[45] Date of Patent: Nov. 27, 1984

[54] FASTENERS FOR JEWELRY AND THE LIKE

[76] Inventor: Vittorio Redi, Olmo, Arezzo, Italy

[21] Appl. No.: 545,233

[22] Filed: Oct. 25, 1983

Related U.S. Application Data

[62] Division of Ser. No. 349,758, Feb. 18, 1982.

[30] Foreign Application Priority Data

Mar. 3, 1981 [IT] Italy .................. 1210/81[U]

[51] Int. Cl.³ .................. A44C 5/02; F16G 15/00
[52] U.S. Cl. .................. 24/240; 24/116 A; 24/237; 24/375; 63/4
[58] Field of Search ............. 24/240, 237, 375, 116 A; 63/4

[56] References Cited

U.S. PATENT DOCUMENTS

| 502,529 | 8/1893 | Piggins | 24/237 |
|---|---|---|---|
| 1,347,515 | 7/1920 | Lutz | 24/116 A |
| 1,648,016 | 11/1927 | Freysinger | 24/237 |
| 1,737,549 | 12/1929 | Ballou, Jr. et al. | 24/237 |
| 1,874,538 | 8/1932 | Johnson | 63/4 |
| 2,180,980 | 11/1939 | Fassnacht et al. | 63/4 |
| 3,168,768 | 2/1965 | Bohlinger et al. | 24/116 A |
| 3,458,993 | 8/1969 | Greene | 24/116 A |
| 3,857,142 | 12/1974 | Hills | 24/237 |

FOREIGN PATENT DOCUMENTS

| 100344 | 2/1916 | United Kingdom | 24/237 |
|---|---|---|---|
| 137735 | 1/1920 | United Kingdom | 24/237 |

Primary Examiner—Victor N. Sakran
Attorney, Agent, or Firm—McGlew and Tuttle

[57] ABSTRACT

A fastener for jewelry and the like comprises a box-shaped structure made of foil and has, at both ends, two transverse seats which receive fastening elements of a chain or the like to which the fastener is attached. One end is formed by a half-open hook which is closed by a resiliently mounted tongue forming part of the box-shaped structure. The tongue is shaped to increase its stiffness so that the fastener will not become unfastened accidentally despite the fact that the foil is of soft metal such as gold.

1 Claim, 8 Drawing Figures

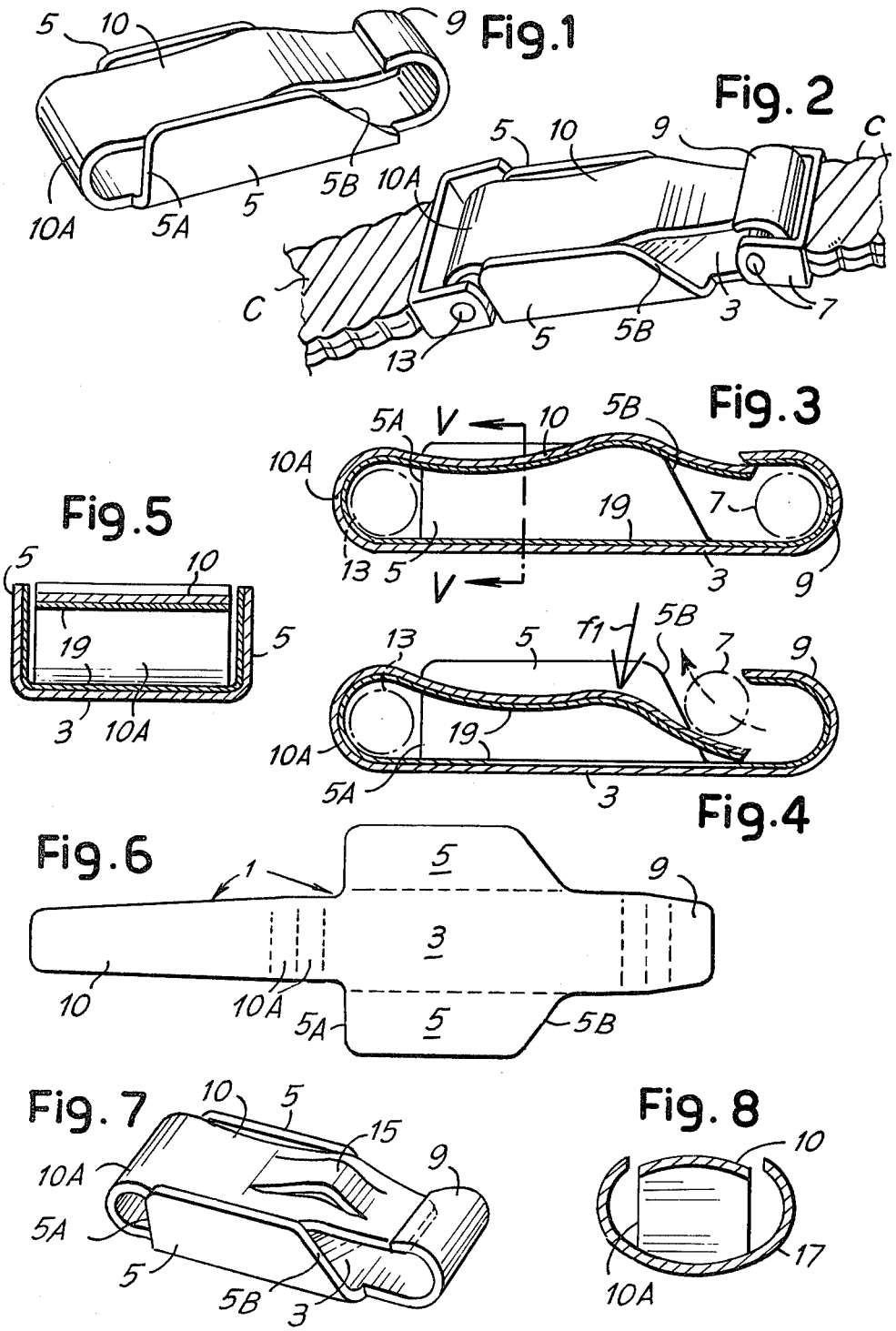

FASTENERS FOR JEWELRY AND THE LIKE

This is a division of application Ser. No. 349,758 filed Feb. 18, 1982.

FIELD OF THE INVENTION

The present invention relates to fasteners for jewellery and the like.

Articles of jewellery, silver ware, trinketry ware and the like require fasteners that can be operated with a minimum of manual intervention and which are composed of a limited number of components. Previously proposed fasteners tend to be relatively complex, not very practical or reliable, and of poor aesthetic quality.

SUMMARY OF THE INVENTION

According to the invention there is provided a fastener for jewellery and the like, comprising a foil bent to form a box-like structure, the structure including a hook defining a seat for a removable fastening element, and a resiliently mounted tongue biased against the interior of the hook to close the seat.

BRIEF DESCRIPTION OF THE DRAWINGS

Embodiments of the invention will now be described, by way of example only, with reference to the accompanying diagrammatic drawings, in which:

FIGS. 1 and 2 are perspective views showing, respectively, a fastener on its own, and when fitted to a chain;

FIGS. 3 and 4 are longitudinal sections showing the fastener in its closed and opened conditions respectively;

FIG. 5 is a section taken on line V—V of FIG. 3;

FIG. 6 shows a foil blank from which the fastener is formed;

FIG. 7 is a perspective view of a modified embodiment of the fastener; and

FIG. 8 is a section similar to FIG. 5 of another embodiment.

DESCRIPTION OF THE PREFERRED EMBODIMENTS

The fastener is formed from a metal foil blank 1 (FIG. 6) having a portion 3 defining the base of the fastener, from the sides of which two symmetrical lugs 5 extend to be bent upwardly. The rear edges 5A of the lugs 5 are approximately at right angles to the base 3, and the front edges 5B are inclined to facilitate the introduction and withdrawal of a bracket or other removable annular fastening element 7 of a chain C. A front extension 9 of the base 3 is so curved as to make up a half-open hook. A longer rear extension 10 is curved at 10A and defines together with the edges 5A a seat for receiving—in an articulated manner—a bracket or other fixed annular fastening element 13 of the chain C. The extension 10 forms a resilient tongue which lies between the two lugs 5 and extends into the cavity of the hook 9.

Preferably, the tongue 10 curves slightly outwardly with respect to the lugs 5 to provide beneficial external stresses, and then curves inwardly near its free end portion so as to enter the cavity of the hook 9. Owing to the elasticity of the metal, the tongue 10 is kept in contact with the inside of the free end of the hook 9 to define in this way a closed transverse cavity for the removable fastening element 7. In order to open this cavity, the tongue must be pressed toward the base 3 in the direction of arrow f1. The sloping edges 5B facilitate the pressure on the tongue as well as the introduction and withdrawal of the removable fastening.

As can be seen from FIGS. 3 and 4, the fastening element 7 has a diameter which is almost as large as the distance between the tongue 10 and a bottom surface of the hook 9 which faces an upper surface of the base 3, when the tongue is fully depressed against the top surface of the base. In this way, as shown in FIG. 3, a secure engagement is obtained between the fastening element 7 and the hook 9.

The blank 1 when bent as described above makes a box-shaped structure.

To facilitate the action on the tongue 10, there may be provided a buckled rib 15 projecting from the center of the tongue (FIG. 7) and which is able to make the downward thrust of the tongue 10 easier.

FIG. 8 shows an embodiment where the base 3 and fins 5 are so shaped as to form a shell 17 having a substantially continuous curvature.

The tongue 10 may be made stiff by a transverse curvature, as can be seen in FIG. 8.

To ensure the elasticity of the tongue, a spring may be arranged between the base 3 and the tongue. This spring may be an elastic foil 19 located in the inside of part 10A and the adjacent zones of base 3 and tongue 10. The elastic foil may be coupled to the blank 1.

What is claimed is:

1. A fastener assembly for jewelry comprising:
   (a) a one-piece foil including:
   a base having lateral sides, a first end and a second end;
   an open hook connected to said first end and curving up over said base with a bottom surface facing said base;
   a curved partial loop connected to said second end and curved up over said base;
   a tongue extending from said curved partial loop forward said open hook and engaged under said open hook and with said bottom surface of said open hook, said tongue extending only partly along said bottom surface;
   a side lug extending upwardly from each lateral side of said base and extending on each side of said tongue, each lug having a rear edge extending at an angle to a plane of said base adjacent said second end of said base and defining with said curved partial loop a through opening, each lug having a forward edge inclined at an angle with respect to the plane of said base and away from said open hook, said base lugs forming a space for receiving a resilient movement of said tongue down away from said bottom surface of said hook into engagement with a top surface of said base;
   said tongue being curved concavely away from said base along a length of said tongue from said partial loop to said open hook for increasing the stiffness of said tongue;
   said tongue having a curved raised projection intermediate a length of said tongue from said partial loop to said open hook and having a length which is a fraction of that of said tongue, said projection disposed centrally on said tongue and having a width less than a total width of said tongue between said lugs;
   (b) an elastic foil superimposed on said one-piece foil and positioned on an interior of said lugs, said partial loop, said open hook and said tongue, for increasing resiliency of said one-piece foil; and (c) a fastening element for engagement in said open hook having a diameter which substantially fills said open hook and which substantially fills a space between said tongue and said bottom surface of said hook when said tongue is in a position down away from said bottom surface of said hook and into engagement with the top surface of said base.

* * * * *